(12) United States Patent
Hartwig et al.

(10) Patent No.: US 11,009,644 B2
(45) Date of Patent: May 18, 2021

(54) OPTICAL SYSTEM WITH DIFFUSERS AND HONEYCOMB CONDENSERS

(71) Applicant: OSRAM GmbH, Munich (DE)

(72) Inventors: Ulrich Hartwig, Berlin (DE); Volker Gaebler, Berlin (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 16/377,260

(22) Filed: Apr. 8, 2019

(65) Prior Publication Data

US 2019/0310411 A1    Oct. 10, 2019

(30) Foreign Application Priority Data

Apr. 9, 2018    (DE) .................... 10 2018 205 315.4

(51) Int. Cl.
| | |
|---|---|
| *G03B 21/20* | (2006.01) |
| *F21V 8/00* | (2006.01) |
| *G02B 5/02* | (2006.01) |
| *G02B 3/00* | (2006.01) |
| *G02B 5/08* | (2006.01) |

(52) U.S. Cl.
CPC ......... *G02B 6/0025* (2013.01); *G02B 3/0056* (2013.01); *G02B 5/0205* (2013.01); *G02B 5/08* (2013.01); *G02B 6/003* (2013.01); *G03B 21/2053* (2013.01)

(58) Field of Classification Search
CPC ...... G03B 21/62; G03B 21/64; G03B 21/606; G03B 21/625; G02B 3/0056; G02B 3/0062; G02B 3/0068; G02B 3/0081; G02B 3/0205; G02B 6/003; G02B 6/0025; G02B 6/0051
See application file for complete search history.

(56) References Cited

U.S. PATENT DOCUMENTS

| | | | |
|---|---|---|---|
| 6,317,263 B1 | 11/2001 | Moshrefzadeh et al. | |
| 2003/0039036 A1* | 2/2003 | Kruschwitz | H04N 9/3161 359/707 |
| 2003/0156266 A1 | 8/2003 | Tanitsu | |
| 2006/0050379 A1* | 3/2006 | Yee | G03B 21/625 359/454 |
| 2006/0204901 A1* | 9/2006 | Shimizu | B29D 11/00278 430/321 |
| 2006/0221453 A1* | 10/2006 | Koehler | G02B 27/285 359/619 |
| 2009/0168187 A1* | 7/2009 | Woodgate | G02B 3/0075 359/623 |

(Continued)

FOREIGN PATENT DOCUMENTS

| | | |
|---|---|---|
| DE | 102015220838 A1 | 4/2017 |
| EP | 2212724 B1 | 10/2011 |

OTHER PUBLICATIONS

German Search Report based on Application No. 10 2018 205 315.4 (8 pages) dated Jan. 8, 2019 (for reference purpose only).

*Primary Examiner* — Sultan Chowdhury

(74) *Attorney, Agent, or Firm* — Viering, Jentschura & Partner MBB

(57) ABSTRACT

In various embodiments, an optical system is provided. The optical system includes two honeycomb condensers, which are connected one behind the other and in each case have two lenticular array sheets, which are connected one behind the other, and at least one diffuser which is connected downstream of the honeycomb condensers.

20 Claims, 4 Drawing Sheets

(56) References Cited

U.S. PATENT DOCUMENTS

| | | |
|---|---|---|
| 2009/0201441 A1* | 8/2009 | Laney ............... G02F 1/133308 349/64 |
| 2011/0188242 A1 | 8/2011 | Brick et al. |
| 2012/0092891 A1 | 4/2012 | Nakagome et al. |
| 2012/0147334 A1* | 6/2012 | Mizushima ............ G02B 27/48 353/31 |
| 2014/0009952 A1 | 1/2014 | Nomura et al. |
| 2016/0290856 A1 | 10/2016 | Fiederling et al. |
| 2017/0038585 A1* | 2/2017 | Martinez ............ G02B 27/0172 |
| 2018/0306425 A1 | 10/2018 | Massmann et al. |
| 2019/0243229 A1* | 8/2019 | Sugiyama ............ G03B 21/625 |

* cited by examiner

OPTICAL SYSTEM WITH DIFFUSERS AND HONEYCOMB CONDENSERS

CROSS-REFERENCE TO RELATED APPLICATION

This application claims priority to German Patent Application Serial No. 10 2018 205 315.4, which was filed Apr. 9, 2018, and is incorporated herein by reference in its entirety.

TECHNICAL FIELD

Various embodiments relate generally to an optical system and a projector having one.

BACKGROUND

For producing bright projectors it is typical to use a powerful halogen or discharge lamp or a multiplicity of LED light sources. When using a plurality of light sources, a problem that rises is that of outputting the emitted radiation via an optical system in a manner such that no inhomogeneity in color and/or in the brightness distribution in the emitted light occurs. In particular, parallel but non-collinear irradiation of an optical unit from different light sources results in a non-homogeneous color and/or brightness distribution in the emitted light. Insufficient homogeneity is a reason not only for a lack of suitability for some technical tasks, but also especially creates a disturbing impression in the case of an observer.

Optical systems having a conductor loop, arranged on an optical element, made of optically relatively transmissive indium tin oxide (ITO) or zinc oxide (ZnO) as part of a monitoring device, are known for example from DE 10 2015 220 838 A1, US 2014/0009952 A1 or US 2016/0290856 A1.

SUMMARY

In various embodiments, an optical system is provided. The optical system includes two honeycomb condensers, which are connected one behind the other and in each case have two lenticular array sheets, which are connected one behind the other, and at least one diffuser which is connected downstream of the honeycomb condensers.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
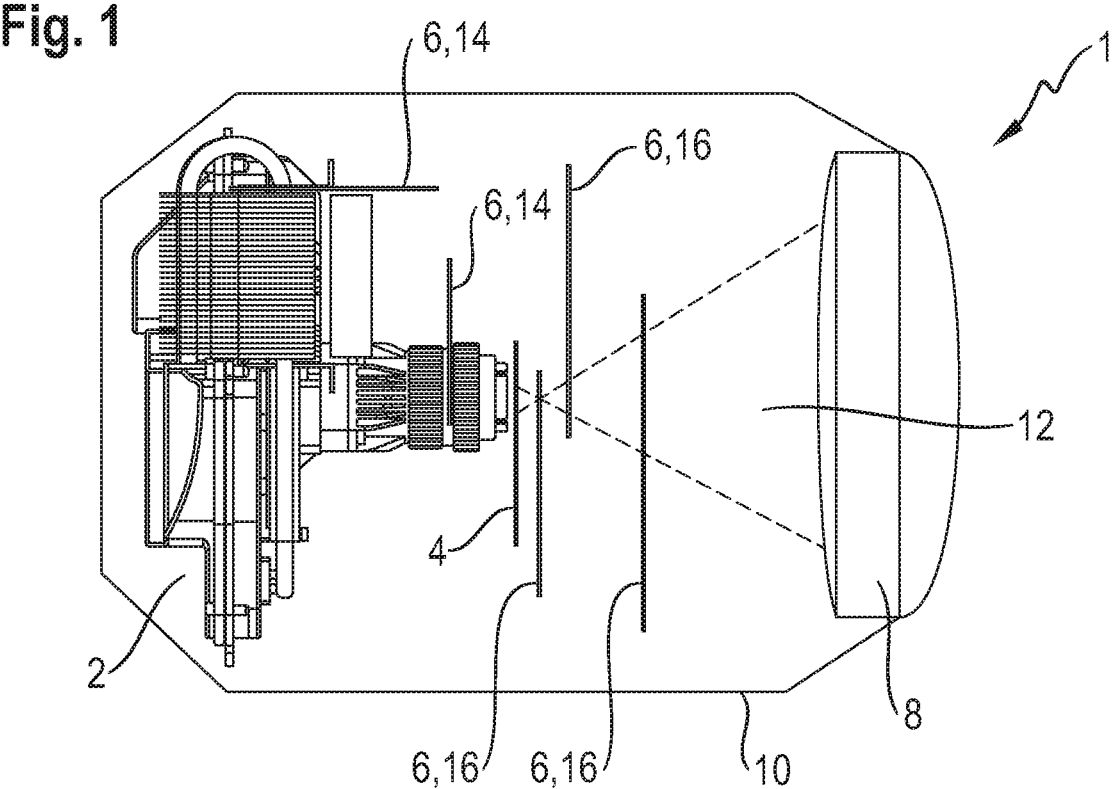
FIG. 1 shows a schematic cross section through a projector in accordance with various embodiments.

The following detailed description refers to the accompanying drawings that show, by way of illustration, specific details and embodiments in which the invention may be practiced.

Various embodiments provide an optical system for homogenizing light from at least two parallel but not collinearly radiating light sources in a spatial and/or angle-related manner. Suitability for high-intensity applications and/or installation space requirements, production requirements and/or economic requirements is preferred.

Various embodiments provide an optical system having at least two honeycomb condensers, connected one behind the other, having in each case (at least) two lenticular array sheets and at least one diffuser connected downstream of the honeycomb condensers. The individual stages of this optical system here interact synergistically with the effect of enhancing homogenization.

A lenticular array sheet is typically configured in the form of a transparent sheet having lens elements (such as microlenses) in a dense, for example hexagonal, array. The lenticular array sheets may be oriented with respect to one another and/or have an identical array (also generally referred to as pattern or honeycomb arrangement) of the lens elements, which may have the same focal length. Each honeycomb condenser having the at least two lenticular array sheets, which are connected one behind the other, can be referred to as a honeycomb condenser stage. The honeycomb condensers in each case effect a multiplying, at least doubling, imaging of the light sources which radiate in each case onto at least two lens elements of the first lenticular array sheet, and thus homogenization. A pattern or array of the lens elements of a lenticular array sheet can here have various embodiments, for example adapted to the respective use. Various embodiments include, in addition to a regular pattern such as a hexagonal and/or a rectangular pattern, a non-rotation-symmetric pattern which is based, for example, on at least one Fibonacci spiral.

The downstream diffuser causes an expansion of the light beams emitted by the lens elements of the second (last) lenticular array sheet of the second honeycomb condenser. Further spatial, such as angle-related, homogenization of the emitted light is achieved hereby. The emitted light is furthermore also homogenized in the near field (plane at infinite object distance), specifically the focal plane of the lens elements of the second lenticular array sheet. The above problem is also achieved by way of a projector having the afore-described optical system and at least two light sources which are arranged for parallel but non-collinear radiation into the optical system. Said projector realizes the effects and properties mentioned of the optical system.

In a development, the optical system can have at least one diffuser which is connected upstream of the honeycomb condenser. The upstream diffuser causes an expansion of respectively incoming light beams, with the result that, by way of example, an incoming light beam irradiates a plurality of lens elements of the first lenticular array sheet. In addition to the homogenization, which inherently occurs due to the expansion, the diffuser thus increases a homogenization reliability even for incoming light beams with very small beam diameters. The combination of upstream diffuser and at least one honeycomb condenser, which is also independently claimable, brings about a light image, which is homogeneous in an in particular spatial, such as angle-related, manner in the far field (plane at infinite object distance), with a simultaneous particularly high homogenization reliability. Consequently, the optical system is suitable for many different projector configurations. Due to the double integration in each case of an upstream and downstream diffuser in an optical system with at least two honeycomb condensers, both the near field and the far field are illuminated homogeneously in a spatial, such as angle-related, manner, wherein the optical system is advantageously not sensitive to a great extent with respect to inhomogeneities of the incoming light distribution.

In addition to the upstream diffuser, or instead of the upstream diffuser, a collimation optical unit for the individual laser beams can be provided, which may produce a correspondingly large beam diameter in the honeycomb condenser plane.

A diffuser (diffusing plate) can be a dedicated structural part, which means that a particularly targeted adaptation to desired properties can be attained. A diffuser can be configured by an optically scattering and/or mixing property of another structural part, such as a diffuse surface of a lens or the like, so as to be able to decrease for example assembly steps, installation space, weight and cost per unit. A defined angle distribution is achieved by using at least one diffuser which is embodied with a holographic structure. A diffuser having a finely structured surface roughness is usable in a particularly economical manner. A structure width may here be less than 200 µm, e.g. even less than 100 µm, to attain great expansion or mixing for typical light beam diameters. If at least one diffuser is formed in one part from an optically transparent material, e.g. from a glass, a polymethyl methacrylate (PMMA), a polycarbonate (PC), a silicone and/or the like, this reduces internal losses. A diffuser can be a diffuser arrangement having at least two diffusers which are connected one behind the other, as a result of which malfunction and failure safety are improved.

In order to compensate artifacts, such as laser speckles, produced by a specific diffuser, e.g. at least one diffuser that is connected downstream of the honeycomb condenser, said diffuser, and/or a diffuser which is connected downstream of said diffuser, can be arranged such that it is able to be driven for a movement having at least one degree of freedom. Due to the movement, the artifacts are "blurred." The diffuser may here be movable e.g. within a beam path or without leaving the beam path so as to e.g. continuously ensure the diffusion. For example, the diffuser can be drivable to perform a laterally alternating movement ("to-and-fro movement transversely to the beam path"), a rotating movement, a tilting movement and/or a transversally alternating movement ("to-and-fro movement along the beam path").

The optical system may include, in addition to the at least one downstream diffuser and the honeycomb condensers, at least one further optical element which is connected upstream, between and/or downstream. Various embodiments provide a transmission optical unit, which is connected between the honeycomb condensers, for example for beam path adaptation. If the transmission optical unit has at least one lens, for example a distance between otherwise structurally identical lenticular array sheets can be adapted. The lens may be an imaging lens, such as a transfer lens. In various embodiments, at least one of the honeycomb condensers is here arranged approximately in a focal plane of the transmission optical unit; the honeycomb condenser is for example approximately arranged in a focal plane when it is arranged up to +/−10 mm, e.g. up to +/−5 mm, e.g. up to +/−2 mm and e.g. up to +/−1 mm next to the focal plane and/or in the focal plane. If the transmission optical unit additionally or alternatively includes at least one deflection mirror, an optical axis can be changed, for example to achieve a construction which is suitable in terms of installation space.

For example in high-intensity applications, it is possible, for avoiding secondary damage, such as personal injury, for capturing primary damage, such as structural failure of an optical element, that at least one diffuser and/or honeycomb condenser is interconnected with an integrity monitoring system. The integrity monitoring system may be embodied in the form of ITO strips or the like. By measuring a current of the ITO strip, a safety switch can interrupt driving of a light source/of the light sources for example in a targeted fashion. Further methods for integrity monitoring of an optical element are the use of ultrasound propagation (ultrasound sensor system), the use of an acoustic microphone for detecting sound arising during the formation of a crack or tear, or the use of scattered light analysis (a defective optical element exhibits changed light scattering or light guidance).

If a diffuser, e.g. at least the downstream diffuser, is held in a frame, such as held stiffly, this increases both the reliability and the functional safety.

To reduce erroneous imaging, such as what are known as ghost images, provision may be made for arranging a shutter opening or shutter apparatus having a defined aperture in a plane of the first honeycomb condenser.

A suitable light source can be any type of radiation source as long as it emits at least a portion of an emitted radiation in the visible and/or ultraviolet and/or infrared range. All light sources of a projector can be of one type, of at least one type, and/or of more than one type. It may be provided e.g. if the different colors are produced by different light source types.

The light source can for example be embodied in the form of: an incandescent lamp; halogen lamp; a discharge lamp; a light-emitting diode (LED); a light-emitting quantum dot diode (QD LED); a laser, e.g. a semiconductor laser; a laser diode array, e.g. a VCSEL or VECSEL laser matrix arrangement; an LED or laser or another light source which is in each case a system operating in accordance with the principle of laser activated remote phosphor (LARP); an IR radiation source; or another apparatus that emits, re-emits and/or produces electromagnetic radiation in and/or partially in and/or near and/or partially near the visible range.

A discharge lamp can be referred to as a high-intensity discharge (HID) lamp, and/or it can be for example a gas-discharge lamp.

A light-emitting diode is in particular intended to mean an LED having a downstream light-emitting substance for partially converting primary light (emission light of the LED) into secondary light (conversion light of the light-emitting substance); a warm-white light-emitting LED; a cold-white light-emitting LED; an LED operated in full conversion; an LED without a downstream light-emitting substance; a pixelated LED matrix arrangement; an organic LED (OLED) and/or the like. In a development, an LED can be an LED arrangement, such as purely by way of example an LED arrangement set up for producing multicolored light. The LED chips may emit white light in the standardized ECE white field of the automotive industry, for example realized by way of a blue emitter and a yellow/green converter. Micro-LEDs, or µLEDs, having for example an area of 0.25 mm$^2$ or with an edge length of 500 µm, are also utilizable and may be provided. In the case of multicolored LEDs, it is possible by combined switching to produce white light, which is preferred here.

In LARP technology, a conversion element that is arranged at a distance from a radiation source and has, or consists of, a phosphor (NB: the term phosphor in the art also includes luminous substances which are non-phosphorous), is irradiated with excitation radiation, e.g. an excitation beam or pump beam or pump laser beam, e.g. with the excitation beam of a laser diode. The excitation radiation is at least partly absorbed by the phosphor and at least partly converted into conversion radiation or into conversion light, the wavelengths of which and hence the spectral properties and/or color of which are determined by the conversion properties of the phosphor. By way of example, this allows the conversion element to convert blue excitation radiation, e.g. blue laser light, into red and/or green and/or yellow conversion radiation. In the case of partial conversion, a superposition of non-converted blue excitation light and yellow conversion light then produces for example white use light.

An IR radiation source can be, in particular, an IR laser diode.

The light sources may be of the type light emitting diodes (LEDs), because LEDs are highly space-saving and energy-saving light sources, wherein other diodes, such as laser diodes, also exhibit these advantages.

In a development, it is preferred when the light sources, such as LEDs, are arranged in accordance with the binning thereof for emitting the different light colors. Binning is understood to mean a classification of produced light sources, e.g. LEDs, in accordance with at least one property, as in the present case in accordance with the emittable light color. It is ensured in this way that the different light colors are determinable very precisely. In various embodiments, it is possible to use different light colors with light sources of the same type (and consequently for example the same requirements and the same actuation).

The light sources of the projector can belong to a light source group. A light source group may include the same light sources (such as LEDs of the same binning), light sources at least of the same type (such as LEDs), light sources at least of a similar type (such as LEDs and laser diodes), and/or different light sources. A light source group may include in each case one red, one blue, and one green light source. Another light source group can consist only of cold-white and/or warm-white light sources, that is to say light sources of different color temperature. Another light source group may include a cold-white, a warm-white, a red, a green, and a blue light source.

In various embodiments, a laser diode is used as at least one of the at least two light sources. A laser diode can be configured in particular for emitting a red, blue, green, warm-white or cold-white laser beam. A laser diode is a preferred form of a laser source.

The projector may have at least one collimator, which is connected downstream of at least one of the light sources, wherein the at least one diffuser, which is connected upstream of the honeycomb condensers, contains at least one diffuser which is connected upstream and/or downstream of the collimator and/or is integrated in the collimator. A diffuser upstream of the collimator can be individually adapted to the respective light source. A diffuser downstream of the collimator can be an equal part. A diffuser integrated in the collimator can be embodied in the form of a structured surface of the collimator so as to save assembly costs and installation space. The diffuser integrated in the collimator can also be configured and/or arranged to effect collimation likewise in a manner that saves assembly costs and installation space, wherein the emitted beams thereof diverge, but diverge in a defined fashion up to a specifiable amount, for example <4°, (full aperture angle). In this way, an integrated diffuser may be obtained e.g. with a light source with a comparatively large output coupling geometry.

If the projector has at least one light source arrangement and a stepped mirror arrangement that is arranged for deflecting light from the light source arrangement to the honeycomb condensers, the at least one diffuser, which is connected upstream of the honeycomb condensers, may contain at least one diffuser which is connected upstream of the stepped mirror arrangement, is integrated in the stepped mirror arrangement, and/or is arranged downstream of the stepped mirror arrangement.

For example, if the light sources emit at least two different wavelengths, the at least one diffuser, connected upstream of the honeycomb condensers, may contain a diffuser which is assigned to only a portion of the light sources and/or wavelengths. This achieves targeted expansion of the corresponding light. In other cases, a diffuser can also be assigned to only a portion of the incoming light beams for example in order to expand different incoming light beams in the same way or differently for homogenization purposes.

In various embodiments, at least one of the light sources (in each case individually) and/or the diffuser which is connected upstream of the honeycomb condenser is configured and/or arranged in a manner such that a distinguishable, such as delimited, distinguishable in terms of luminous flux and/or distinguishable in terms of wavelength, light beam irradiating the first lenticular array sheet has a diameter that corresponds at least to the diameter or the structure width of the lenses of the lenticular array sheet, e.g. is twice as large. This improves expansion from the first to the second lenticular array sheet and thus makes an enhancing contribution to the homogenization.

Great efficiency can be achieved if the angle of incidence of the totality of the laser beam bundles into the first lenticular array sheet is included within an acceptance angle of the respective lens(es) and may be less than full width at half maximum, in the present case 4°. The angle of incidence is able to be configured first by at least one of the light sources (in each case individually) and/or secondly by the diffuser that is connected upstream of the honeycomb condenser.

A projector 1, illustrated in FIG. 1 to FIG. 4, as an example of a stationary projector for event and entertainment purposes, includes a light module 2, which together with an at least partially closing shutter 4 and further optical elements 6 ("gate" in the art) are housed in a housing 10 in a manner in which they are connected upstream of a projection lens 8.

Light 12, which has been coupled out of the light module 2, is guided through the shutter 4 and others of the optical elements 6 to be emitted in collimated fashion through the projection lens 8.

The optical elements 6 include internal optical elements 14, which are arranged and configured such that they are able to be switched/introduced within the light module 2 in the optical path or at least into the optical path, and external optical elements 16, which are arranged and configured such that they are able to be switched/introduced outside the light module 2 in the optical path or at least into the optical path. At least one external optical element can be for example an element which is referred to in the art as gobo, or graphical optical blackout. At least one optical element 6 can be formed for example from an optical material, e.g. having a refractive index of 1.3 or more. At least one optical element 6 can be for example a lens, a cylindrical lens, a prism, a diamond-like structure, a TIR (total internal reflection) element, a kaleidoscope element, a shutter, a plurality thereof or an arrangement therewith, and/or a combination thereof. At least one optical element 6 can be designed for example to be stationary, to be interchangeable by a rotatable disk or the like, and/or to be itself rotatable. At least one optical element 6 can be embodied for example in LCD (liquid crystal display) technology, such as LCoS (liquid-crystal on silicon) technology or in DMD (digital (micro)mirror device) technology. An optical element 6 in LCD technology can serve for producing a variable pattern, wherein the losses are advantageously low in an exemplary combination with laser light due to the polarization. A multiplicity of optical elements 6 in LCD technology in the optical path can be advantageous in order to shape not only a plane of the light beam, but to shape the entire light beam, wherein e.g. to this end the LCD elements can be advantageously arranged for example directly before a first lenticular array sheet, between the lenticular array sheets, and/or after the lenticular array sheets near an outlet of the light module 2.

The shutter 4 can be used to control the light emission. It can be arranged for example upstream of the external optical elements 16 in order to control the entire light emission or at any position along the optical path within the light module 2 in order to control the light emission for example for only a portion of the light, such as a set of wavelengths. A shutter can be designed for example as an iris diaphragm and/or as at least one adjustable slit.

Figure 2:
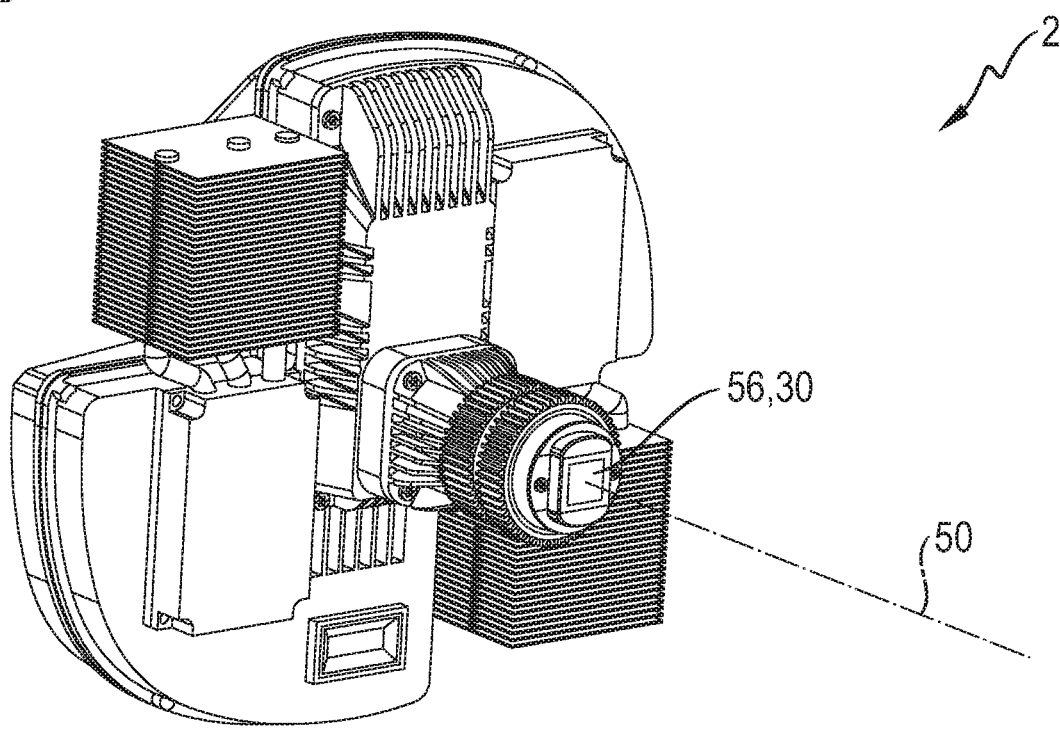
FIG. 2 shows a perspective view of a light module of the projector in accordance with various embodiments.
Figure 3:
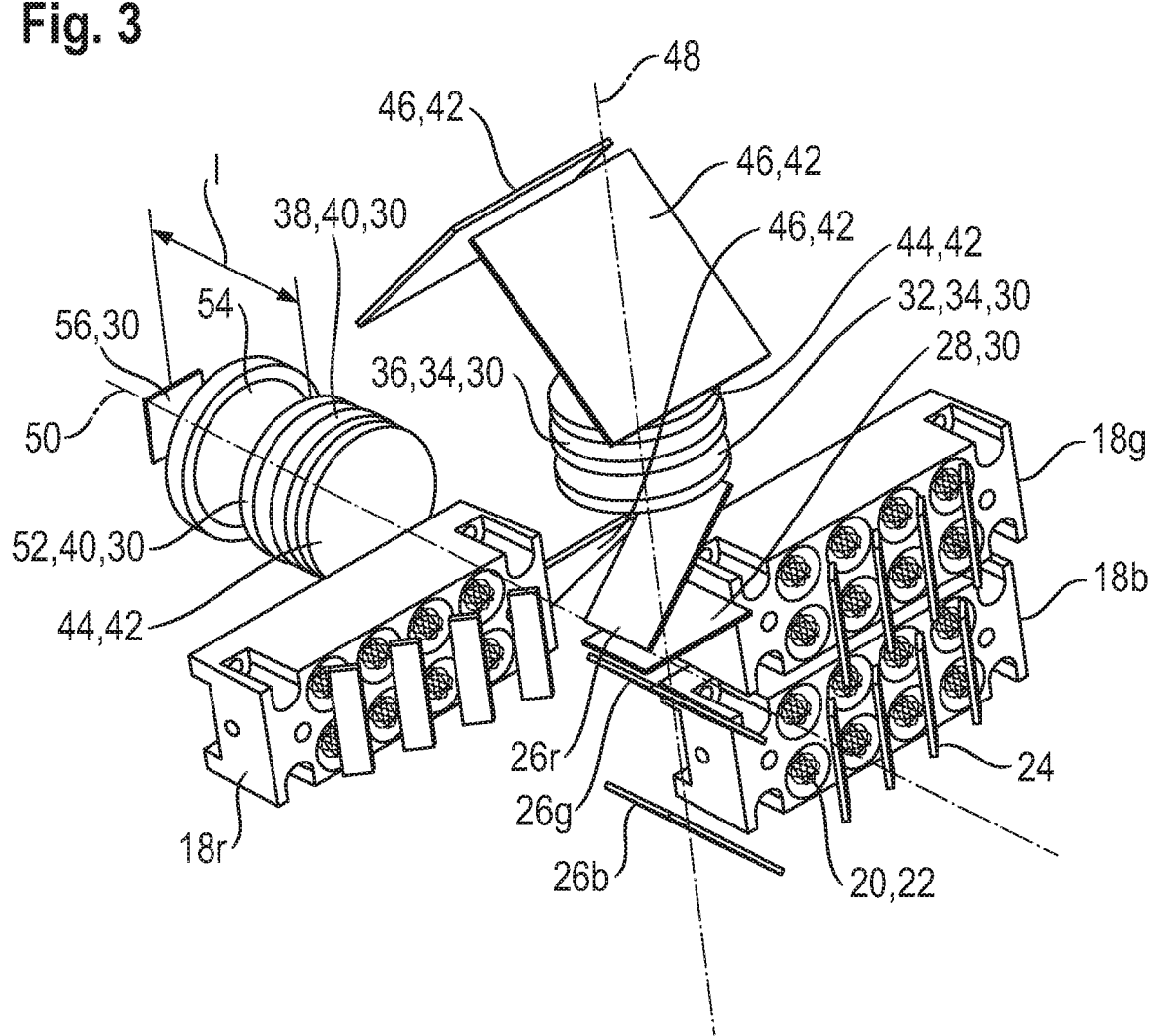
FIG. 3 shows a perspective view of the optical elements of the light module including an optical system in accordance with various embodiments.
Figure 4:
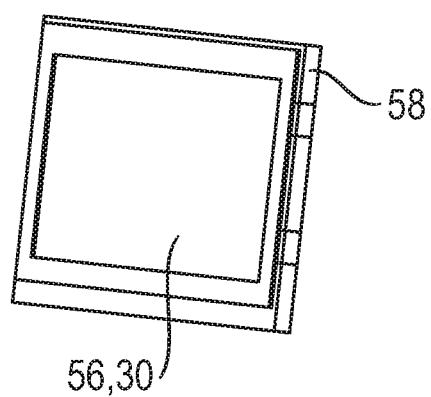
FIG. 4 shows a perspective view of an outlet diffuser in a frame.

Light module 2 in FIG. 2 is varied slightly, for example with respect to embodied cooling radiators, over the embodiment of the light module 2 that is illustrated in FIG. 1. FIG. 3 illustrates an internal space of the light module 2.

The light module 2 contains three light source arrangements 18, which include in each case a laser bench having, in the present case, eight laser diodes 20 as light sources and a collimator 22, which is connected downstream of the respective laser diode 20, which are accommodated in a common heat sink. The three light source arrangements 18 in the present case are a laser bench 18r configured for emitting red light, a laser bench 18g configured for emitting green light, and a laser bench 18b configured for emitting blue light. A stepped mirror 24 is connected downstream of each light source arrangement, with the mirror elements of the stepped mirror 24 being designed for deflecting one of at least one respective light source 20 to an optical element that is connected downstream, here an at least dichroic deflection mirror 26 (that is to say a "normal" deflection mirror or a dichroic deflection mirror; that is to say a deflection mirror reflecting at least one wavelength). The deflection mirrors 26 serve for collecting or deflecting the light beam bundles, which are radiated in distributed fashion by the individual light source arrangements 18r, 18g, 18b, into a single light beam bundle, wherein in the present case, a deflection mirror 26b is configured for reflectively deflecting at least blue light, a deflection mirror 26g is configured for reflectively deflecting at least green light and for transmitting at least blue light, and a deflection mirror 26r for reflectively deflecting at least read light and for transmitting at least blue and green light.

A first diffuser 28, which is part of an optical system 30, is connected downstream of the deflection mirrors 26b, 26g along the optical path. The diffuser 28 thus effects expansion in the present case of the blue and green components in the light beam bundle. This arrangement may be provided e.g. if, for example, due to the type of light source, the individual blue and green light beams have a smaller diameter than the individual red light beams.

A first lenticular array sheet 32 of a first honeycomb condenser 34, which is a part in accordance with various embodiments of the optical system 30, is arranged downstream of the deflection mirror 26r (and consequently also of the diffuser 28). A transmission optical unit 42 is arranged between a subsequently arranged second lenticular array sheet 36 of the first honeycomb condenser 34 and a first lenticular array sheet 38 of a second honeycomb condenser 40; the transmission optical unit 42 is also connected between the inner lenticular array sheets 36, 38 of the honeycomb condensers 34, 40. The transmission optical unit 42 in the present case includes two transmission lenses 44. The lenticular array sheets 36, 38 are located in the respective focal length of the associated transmission lens 44 (that is to say that, for example, the second lenticular array sheet 36 is located in the focal plane of the transmission lens 40 which is positioned next to it). The present transmission optical unit 42 furthermore includes, by way of example, three deflection mirrors 46 which are arranged such that, using in the present case three deflections of 90°, a first optical axis 48 of the first lenticular array sheet 32 is approximately perpendicular to a second optical axis 50 of a second lenticular array sheet 52, wherein a point of intersection (or shortest distance) of both optical axes 48, 50 is positioned approximately in the middle third, preferably approximately centrally, of the first optical axis 48. The arrangement of the deflection mirrors 46 makes it possible for the second optical axis 50, and consequently the output light beam 12, to be arranged approximately centrally with respect to the light module 2. The result of this may be a symmetry (for example in terms of installation space) of the light module 2 with respect to the stationary mounting thereof and a weight distribution which is uniform with respect to the optical axis 50. The deflection mirrors 46 thus effect a form factor.

A honeycomb condenser 34, 40 is configured for example as follows: a lenticular array sheet may have a thickness of approximately 2 mm. The microlenses are arranged preferably on the entrance side of the respectively first lenticular array sheet 32, 38 and on the output side of the respectively second lenticular array sheet 36, 52. A distance (intermediate space) between the lenticular array sheets 32 and 36, and 38 and 52 may be approximately 5-15 mm. A focal plane of the microlenses may be arranged at a distance of approximately 5 to 20 mm from the respective lenticular array sheet 32, 36, 38, 52.

Connected downstream of the honeycomb condensers 34, 40 are an outlet lens 54, which is optional and advantageously adaptable to the specific use, and a second diffuser 56, which are part according to various embodiments of the optical system 30. The second diffuser 56 is accommodated for example in a frame 58, cf. FIG. 4, in order to keep mechanical stresses away from the optically transmissive structural element in order to increase failure safety. In addition, the frame 58 has the effect that the diffuser 56 cannot fall out if the diffuser 56 breaks, which means that the frame 58 contributes to the functional safety. In the present case, the second diffuser 56 forms the output coupling surface of the light module 2.

Within the light module 2, the optical system 30 has the effect of good color homogenization of the emitted light and uniform irradiance distribution (referred to in the art as flat top irradiance distribution) for each of the colors, specifically both in a spatial manner and also in an angle-related manner in the near field and far field.

The laser benches 18 are the main heat sources in the light module 2, and they are thermally coupled for example via at least one heat pipe to at least one radiator or fan-supplied radiator. Moreover, the light module 2 can include a memory, such as an EEPROM, for storing module information such as a serial number, operating duration and/or component information, such as laser diode information, and also electrical and/or electronic components for connecting and/or controlling purposes. The light module furthermore includes for example a housing having fastening points e.g. for stationary applications.

Figure 5:
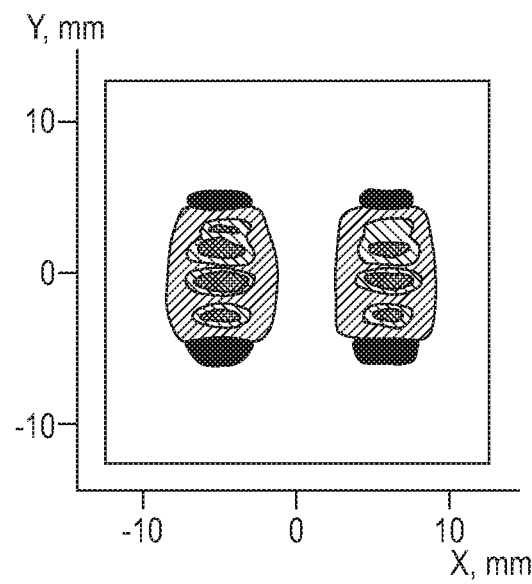
FIG. 5 shows an example of a spatial distribution of light beams radiating into the optical system in accordance with various embodiments.
Figure 6:
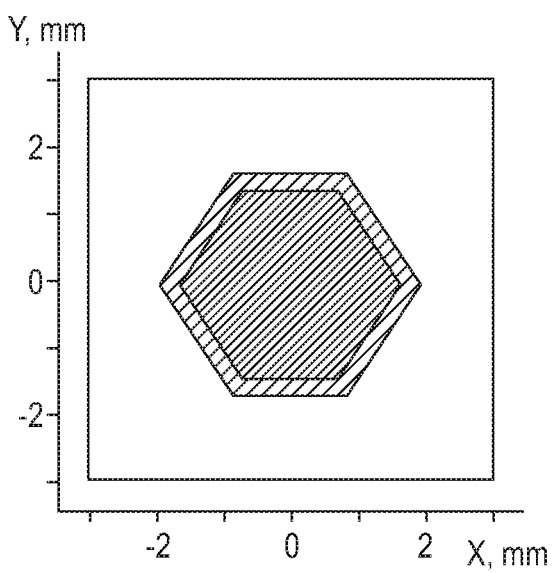
FIG. 6 shows an example of a spatial distribution of a light beam leaving the optical system in accordance with various embodiments.
Figure 7:
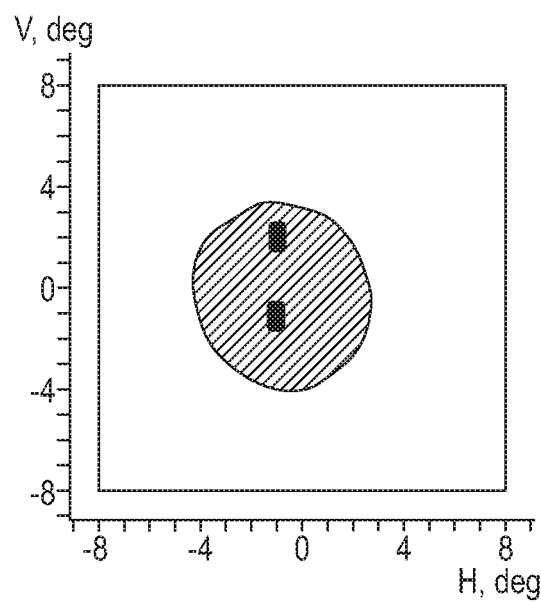
FIG. 7 shows an example of an angle-dependent distribution of light beams radiating into the optical system in accordance with various embodiments.
Figure 8:
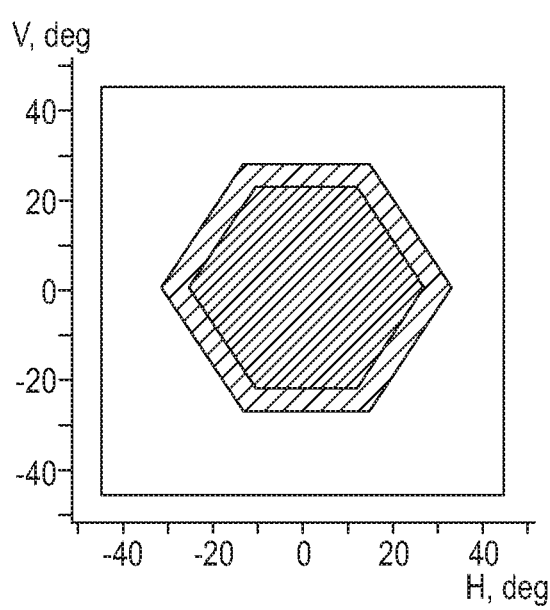
FIG. 8 shows an example of an angle-dependent distribution of a light beam leaving the optical system in accordance with various embodiments.

The effect of the optical system will be illustrated below with reference to light distribution diagrams. FIG. 5 shows a spatial light distribution, and FIG. 7 shows an angular light distribution, both with respect to the first lenticular array sheet 32. The diagrams thus include the expanding effect of the first diffuser 28 with respect to two out of the three colors. The individual light beams radiating into the first lenticular array sheet 32 are clearly distinguishable on the basis of their brightness and color distribution. By contrast, FIG. 6 shows a spatial light distribution and FIG. 8 an angle-related light distribution downstream of the second diffuser 56. It is almost no longer possible to ascertain color- or intensity-related differences; rather, an approximately uniform light distribution is obtained.

Figure 9:
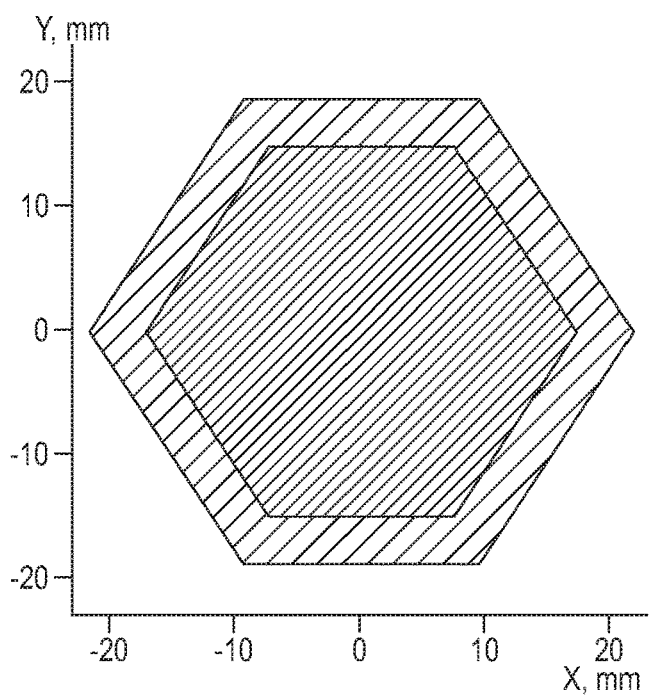
FIG. 9 shows an example of a spatial distribution of a light beam leaving the optical system in accordance with various embodiments.
Figure 10:
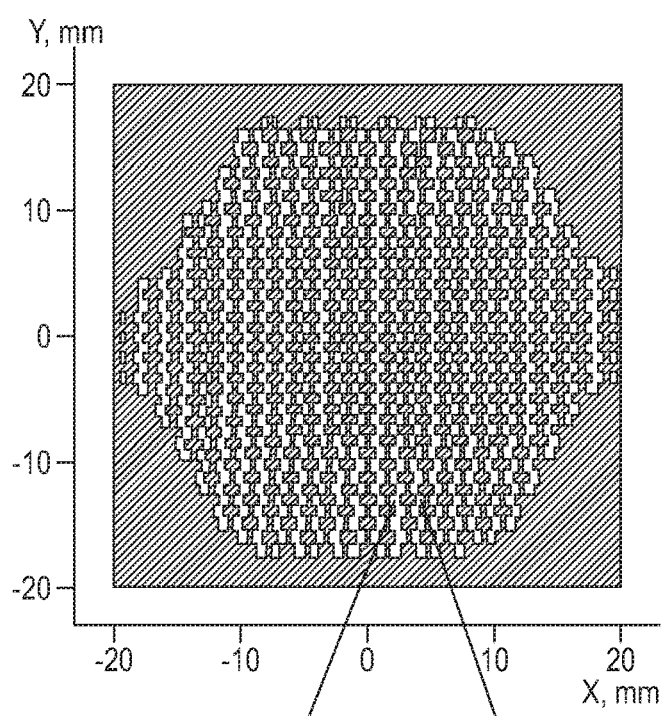
FIG. 10 shows an example of a spatial distribution of a light beam emitted by a honeycomb condenser of the optical system in accordance with various embodiments.
Figure 11:
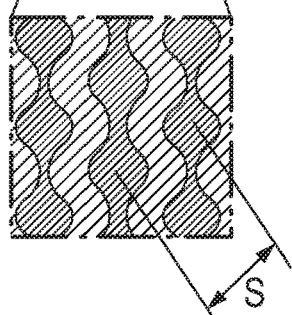
FIG. 11 shows an enlarged detail from FIG. 10.

FIG. 9 to FIG. 11 represent an effect of the second diffuser 56. While FIG. 9 illustrates, comparably to FIG. 6, a spatial light distribution downstream of the second diffuser 56, which is homogeneous and uniform, FIG. 10 represents a spatial light distribution in the focal plane (near field) of the second lenticular array sheet 52 that is located at a distance d from the second lenticular array sheet 36. The light distribution forms a regular structure in accordance with the array of the lenticular array sheet 52, wherein FIG. 11 illustrates a magnified detail for demonstration purposes. It shows a structural width s as the shortest distance between respective center points between two adjacent dark regions. The second diffuser 56, which is arranged at a distance l from the second lenticular array sheet 52, has an average scattering angle α, which may comply with $\alpha \geq \arctan(s/(l+d))$, with the result that particularly good homogenization is achieved.

Consequently, an optical system having two honeycomb condensers and a downstream diffuser is disclosed for achieving homogeneous light distribution.

LIST OF REFERENCE SIGNS headlamp 1
light module 2
screen 4
optical element 6
projection lens 8
housing 10
light 12
internal optical element 14
external optical element 16
light source arrangement 18, 18r, 18g, 18b
laser diode 20
collimator 22
stepped mirror 24
dichroic deflection mirror 26, 26r, 26g, 26b
first diffuser 28
optical system 30
first lenticular array sheet 32
first honeycomb condenser 34
second lenticular array sheet 36
first lenticular array sheet 38
second honeycomb condenser 40
transmission optical unit 42
transmission lens 44
deflection mirror 46
first optical axis 48
second optical axis 50
second lenticular array sheet 52
outlet lens 54
second diffuser 56
frame 58
distance l
structure width s While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An optical system, comprising:
    two honeycomb condensers connected one behind the other where each honeycomb condenser has two lenticular array sheets connected one behind the other;
    a transmission optical unit connected between the honeycomb condensers; and
    at least one diffuser connected downstream of the honeycomb condensers.

2. The optical system of claim 1, further comprising:
    at least one diffuser which is connected upstream of the honeycomb condensers.

3. The optical system of claim 1,
    wherein at least one diffuser is embodied with a holographic structure.

4. The optical system of claim 1,
    wherein at least one diffuser has a finely structured surface roughness.

5. The optical system of claim 4,
    wherein at least one diffuser has a structure width of less than 200 μm.

6. The optical system of claim 1,
    wherein at least one diffuser is arranged within a beam path such that it is configured to move with at least one degree of freedom.

7. The optical system of claim 6,
    wherein at least one diffuser which is connected downstream of the honeycomb condensers, is arranged within a beam path such that it is configured to move with at least one degree of freedom.

8. The optical system of claim 1,
wherein the transmission optical unit has at least one lens; and a
wherein at least one of the honeycomb condensers is arranged approximately in a focal plane of the transmission optical unit.

9. The optical system of claim 1,
wherein the transmission optical unit comprises at least one deflection mirror.

10. The optical system of claim 1,
wherein at least one diffuser and/or honeycomb condenser is interconnected with an integrity monitoring system.

11. The optical system of claim 1,
wherein at least one diffuser is accommodated in a frame.

12. The optical system of claim 11, further comprising:
at least one light source arrangement; and
a stepped mirror arrangement that is arranged for deflecting light from the light source arrangement to the honeycomb condensers;
wherein the at least one diffuser, which is connected upstream of the honeycomb condensers at least one of is integrated in the stepped mirror arrangement or is arranged downstream of the stepped mirror arrangement.

13. The optical system of claim 11,
wherein the light sources emit at least two different wavelengths;
wherein the at least one diffuser, connected upstream of the honeycomb condensers, contains a diffuser which is assigned to only a portion of at least one of the light sources or the wavelengths.

14. The optical system of claim 1,
wherein at least one of the light sources is a LARP light source, a laser source, and/or at least a part of an RGB light source arrangement.

15. A projector, comprising:
an optical system, comprising:
two honeycomb condensers connected one behind the other where each honeycomb condenser has two lenticular array sheets connected one behind the other;
at least one diffuser connected downstream of the honeycomb condensers;
at least two light sources arranged for parallel but not collinear radiation into the optical system; and
at least one collimator connected downstream of at least one of the at least two light sources;
wherein the at least one diffuser is either connected upstream or downstream of the collimator or is integrated in the collimator.

16. An optical system, comprising:
two honeycomb condensers connected one behind the other where each honeycomb condenser has two lenticular array sheets connected one behind the other; and
at least one diffuser connected downstream of the honeycomb condensers; wherein
at least one diffuser of the at least one diffuser is arranged within a beam path such that it is configured to move with at least one degree of freedom.

17. The optical system of claim 16, wherein at least one diffuser connected downstream of the honeycomb condensers is arranged within a beam path such that it is configured to move with at least one degree of freedom.

18. The optical system of claim 16, further comprising a transmission optical unit connected between the honeycomb condensers.

19. The optical system of claim 18, wherein the transmission optical unit has at least one lens; and
wherein at least one of the honeycomb condensers is arranged approximately in a focal plane of the transmission optical unit.

20. The optical system of claim 18,
wherein the transmission optical unit comprises at least one deflection mirror.

* * * * *